United States Patent [19]

Billings

[11] Patent Number: 4,692,604

[45] Date of Patent: Sep. 8, 1987

[54] FLEXIBLE INDUCTOR

[75] Inventor: Robert L. Billings, Andover, Mass.

[73] Assignee: American Telephone and Telegraph Company, AT&T Bell Laboratories, Murray Hill, N.J.

[21] Appl. No.: 664,555

[22] Filed: Oct. 25, 1984

[51] Int. Cl.⁴ ............................................. G06K 19/06
[52] U.S. Cl. .................................. 235/493; 235/449; 235/450; 336/20
[58] Field of Search ............... 235/449, 450, 492, 493; 336/20

[56] References Cited

U.S. PATENT DOCUMENTS 3,613,101  10/1971  Leonard et al. ................. 235/493 X
4,056,411  11/1977  Chen et al. .......................... 148/121
4,187,128   2/1980  Billings et al. ...................... 148/121
4,233,523  11/1980  Jarder et al. ....................... 336/20 X
4,447,716   5/1984  Aigo .................................... 235/492

Primary Examiner—David L. Trafton
Attorney, Agent, or Firm—Joseph A. Cameron

[57] ABSTRACT

Contactless inductive power transfer from a stationary "reader" to energize the electronics on a portable data or "smart" card is made practical through a flexible inductor carried on the card. The inductor, which acts as the secondary portion of a power transformer, comprises a flat coil and a flexible magnetic but nonmagnetostrictive core piece. The core piece may be a thin wafer of amorphous magnetic alloy. Clock pulses to synchronize data transfer on the card with the reader can also be generated from the signal picked up by the inductor.

11 Claims, 5 Drawing Figures

FIG. 2
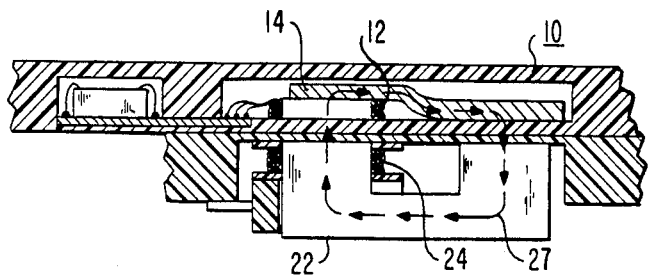
FIG. 3
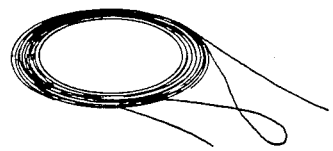
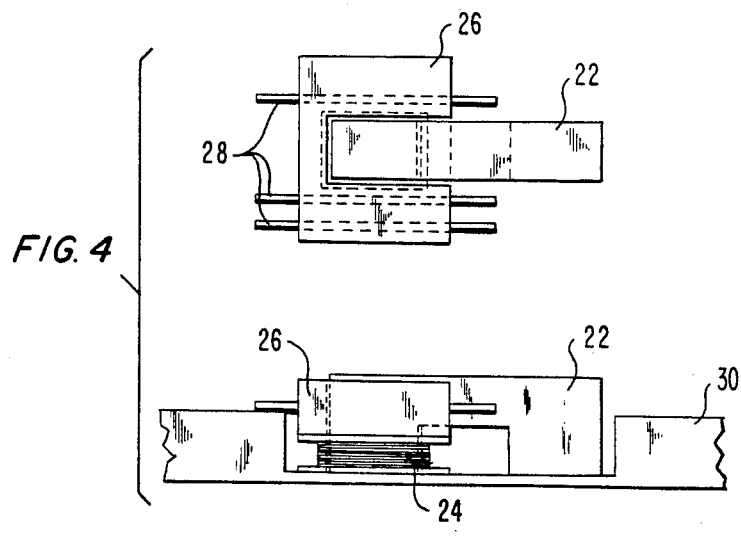
FIG. 4

FLEXIBLE INDUCTOR

BACKGROUND OF THE INVENTION

This invention relates to electrical transformers of a type in which the primary and secondary portions are separable. More particularly, it relates to an inductor than can be embedded in a plastic credit card to receive magnetically transmitted power and information.

The use of plastic credit cards for credit purchases and for banking transactions has become so popular that most travelers today do so with very little cash. The card, embossed with an account number and the name of the account owner, serves solely to identify an authorized account to be charged for the transaction. A magnetic strip on the back of some cards contains the same information but is machine readable to speed the transaction. All accounting information is stored at the bank or credit house.

As a result, it is easy for a thief to use a stolen card or for a legitimate owner to exceed his credit limit. Most merchants, therefore, require that before purchases above a relatively modest amount such as $50 are completed, the authorization must be verified with the credit house. Even with automatic telephone dialing the procedure is cumbersome and time consuming. Furthermore, a separate card is needed for each account. With the advent of recent advances in microcircuitry, however, it is now possible to put a vast amount of computing power and memory right in the card to produce a "smart card" or "personal card." The card could therefore carry personal identification data to virtually eliminate fraudulent use—such data as personal characteristics, driver's license and Social Security numbers, personal key numbers and even voice prints. The card could also carry the account numbers of all of the owners' charge accounts, the balances of all of the accounts, the credit limits of all of the accounts, and other such personal data as, for example, the sizes of family members for clothing purchases, personal telephone directories, etc. The types of personal data are limited only by one's imagination.

The technology for putting all of this on the standard size plastic card is here. What is holding up this very convenient card, however, is what at first appears to be the mundane problem of supplying to the card the small amount of power needed to drive the microprocessor and the memory.

The simplest approach would seem to be that of ordinary conduction. Metal contacts on the card would engage mating spring loaded contacts in the card reader, the machine that interfaces with the card, in a manner similar to that in which replaceable printed circuit boards are plugged into electronic equipment. The thousands of transactions daily that can occur with a busy reader, however, can create a very serious wear problem. Potentially even more important than the wear problem, however, is that of non-conductive dirt. Not only can the card contacts easily accumulate dirt and grit that would make the contact unreliable, but it has become an all too common prank for vandals to spray aerosol, non-conductive paint directly into the receptacles of publicly accessed machines.

Batteries are in general too bulky to be carried in a normal sized plastic card, even modern watch batteries. Solar cells can be made to work, but high light levels would have to be provided inside the reader, and considerable card space used.

While capacitive information transfer is practical, experience has shown that for capacitive power transfer from the reader, large areas of the card would be used up, and the spacing between the capacitive plating on the card and that on the reader would have to be held to a closer tolerance than is practical. Variations of one or two-thousandths of an inch can create very high or very low voltages.

Finally, for inductive power transfer an air core transformer is insufficient; a magnetic core must be carried on the card. However, the normal flexing of a plastic credit card, such as occurs to one carried in a hip pocket, immediately destroys the magnetic properties of the core, disabling the power transformer. Until my invention, therefore, the lack of a satisfactory power transfer method has delayed the widespread use of a contactless "smart" personal data card.

SUMMARY OF THE INVENTION

According to my invention, inductive power transfer from the reader to the card is made practical through the use of a flexible magnetic cored inductive device which may be embedded in the plastic card. The inductive device of the invention may comprise a flexible winding and a flexible core piece of magnetic but non-magnetostrictive material located adjacent to the winding to force an externally generated magnetic field to link the winding.

BRIEF DESCRIPTION OF THE DRAWING

FIG. 2 is a cross-section drawing of an embodiment of the invention and its cooperation with the reader.

FIG. 3 illustrates a coil that can be used to implement the invention.

FIG. 4 is a set of two views of a transformer primary section which may be located in the reader;

DETAILED DESCRIPTION

Figure 1:
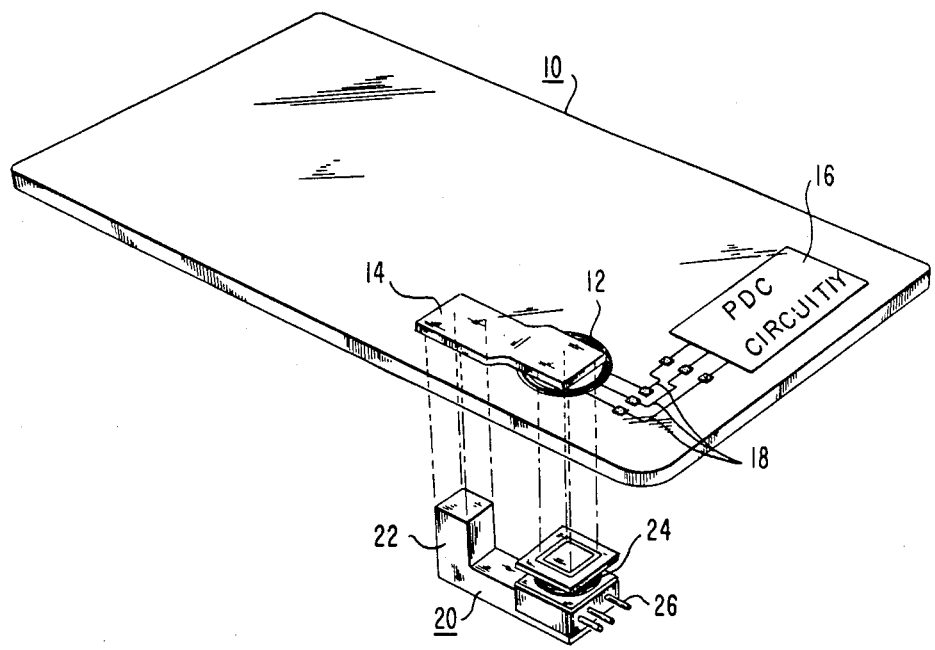
FIG. 1 is an illustration of an embodiment of the invention embedded in a plastic card.

In the embodiment of the invention shown in FIG. 1, a plastic transaction card 10 has embedded in it a flexible coil 12, a flexible core piece 14 and personal data card (PDC) circuitry 16. The PDC circuitry 16 may include a microprocessor, one or more chips of memory and a rectifier and voltage regulator. Printed wiring 18 connects the three leads that represent what could be the two ends and centertap of coil 12 to the rectifier included in the PDC circuitry. The design of the voltage rectififer and regulator PDC circuitry is well known and within the capability of those skilled in the art.

When card 10 is inserted into a reader, coil 12 and flexible core piece 14 are located adjacent to a transformer primary section 20, which is part of the reader. The transformer primary section 20 may advantageously include a U-shaped ferrite core 22 and a coil 24 wound on a bobbin 26.

The operation of the inductive device of the invention to form the secondary portion of a transformer in cooperation with the primary portion located in the reader is illustrated in the cross-section drawing of FIG. 2.

When card 10 is in place, secondary core piece 14 and coil 12 are lined up adjacent to primary transformer core 22 in the reader. According to the rules of physics, the flux generated by ac current in coil 24 takes the shortest available magnetic path. Because of the high permeability of both core 22 and strip core 14, it selects path 27 from core 22 through the reader-to-card interface, coil 12, core piece 14, and back through the card-to-reader interface into core 22. The changing magnetic flux linking coil 12, of course, generates an ac voltage which is rectified by the PDC circuitry on the card to provide dc power to the microprocessor and memory. It can be seen that there is no metallic contact between any of the circuitry on the card and any of the circuitry in the reader. In order for sufficient power to be transferred reliably with reasonable spacing tolerances, it is important that the gap between cores be small and that core pieces 22 and 14 have high permeability.

Were it not for the desirability of allowing some flexibility in the card, design of core piece 14 and hence inductive power transfer would be relatively ordinary. Traditional magnetic core materials, however, have virtually no tolerance to bending. A card core piece made of ferrite would fracture with even slight bending. The results would be the addition of air gap, greatly decoupling the two coils.

Other materials, such as permalloy, exhibit too great a magnetostrictive effect. Flexing such materials destroys permeability. I have found, however, that an amorphous magnetic alloy which is nonmagnetostrictive is well suited for flexible core piece 14.

Manufacture of this type material is explained in U.S. Pat. No. 4,056,411, which issued Nov. 1, 1977 to Chen et al. In addition, U.S. Pat. No. 4,187,128 which issued Feb. 5, 1980, to Billings et al describes heat treatment which may be advantageous. Amorphous alloys which are suitable for practicing the invention are manufactured by Vacuumschmelze GMBH under the trade name Vitrovac. The material can be purchased from Vacuumschmelze, 186 Wood Avenue, South, Iselin, N.J. 08830.

Because of the necessity to rapidly cool the alloy during manufacture, it is available only in sheets approximately one mil thick. I have found, however, that a suitable core piece can be formed simply by cutting a strip of alloy with a scissor and bending it into the shape shown in FIGS. 1 and 2.

Production methods such as die cutting and bending can also be used without damaging the core properties.

The coil which forms the secondary winding carried on the personal data card can take any number of forms as long as the magnetic flux generated by the primary winding links it with a minimum of leakage. It can, for instance, be wound directly on the amorphous alloy core strip. Alternatively, several turns of a hollow spiral can be made on a thin flexible substrate by printed circuit technology. Several layers can be laminated together, with care taken to connect the windings of each layer in a common sense.

From a standpoint of ease of manufacture and low cost, however, one of the better coil structures comprises several turns wound around a mandrel on an automatic winding machine and cemented together to withstand handling. Such a simple coil is illustrated in FIG. 3.

A suitable structure for the primary portion of the transformer located in the reader is shown in FIG. 4. Core 22 is a standard U-shaped sintered ferrite core with a rectangular cross-section. Fitted on one leg of core 22 is a molded plastic bobbin 26. Embedded in the bobbin are three copper square wire terminals 28 with both ends protruding. Coil 24 may be machine wound on bobbin 26 with the winding ends and center tap wrapped on one protruding end of respective terminals 28. The wound bobbin may be assembled to the core and the assembly cemented in place in a recess in a printed circuit board 30. The distance between a lower flange of bobbin 26 and terminals 28 can be designed so that the free ends of terminals 28 make contact with the printed wire on board 30 for a solder connection.

In order to keep the air gap between the primary core 22 and the card core piece 14 low, board 30 may form one side of the slot in the reader into which the personal data card is inserted by the user.

Figure 5:
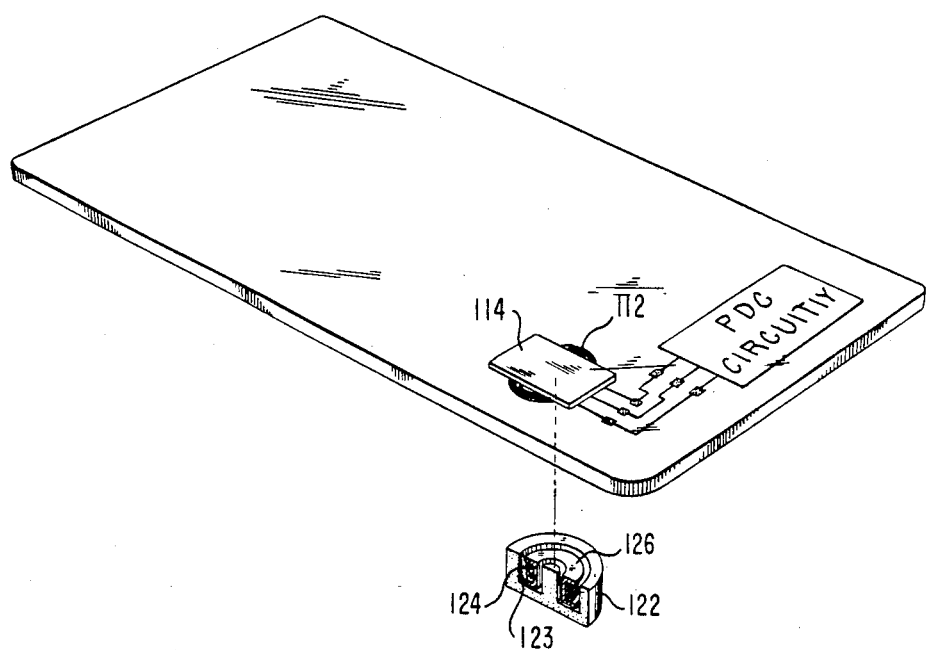
FIG. 5 is an illustration of an alternate embodiment of the invention.

A more efficient transformer structure for practicing the invention is shown in FIG. 5. This structure takes advantage of not only the efficiency but also the wide availability of transformer "pot" cores. The inductor that forms the reader half of the power transformer may be of standard ferrite pot core construction as shown in cross section. A cylindrical core 122 has an annular recess 123 in one face. Primary coil 124 wound on a plastic bobbin 126 fits into recess 123. Access slots in core 122 allow the ends of coil 124 to be connected to the source of power.

The flexible inductor on the personal data card which forms the transformer secondary may be merely a coil 112 as in FIG. 3 backed up by a square of amorphous magnetic alloy. In this case it is better if the amorphous alloy protrudes beyond coil 112 in all directions to provide a flux path.

One of the requirements for digital data transfer into and out of storage and data processing is a source of clock pulses so that the data processes can be synchronized. The inductive power transfer made possible by my invention is also an excellent source for timing clock pulses. In fact, if the frequency of the alternating current applied to primary winding 24 or 124 is synchronized with the clock pulses in the reader, synchronized clock pulses can be derived easily from the waveform induced in coil 12 or 112 in the card. Such simple power and synchronized clock circuits are well known in the art. It has been found that a clock power frequency rate of approximately 2 MHz provides satisfactory timing and power for this application. Power in the neighborhood of 300 milliwatts is readily available with the U-core structure or the pot core structure.

I have described a practical construction of a personal data card that is flexible and can inductively receive both the power and the timing from a transformer primary section mounted in a reader. Other structures may occur to those skilled in the art which do not depart from the spirit and the scope of my invention.

What is claimed is:

1. In combination with a portable data card having at least one electronic device, a flexible inductor for converting transmitted magnetic energy into electric energy to energize said electronic device comprising a flat electrically conductive multiturn coil and a flexible magnetic and nonmagnetrostrictive core piece attached to said card to direct said transmitted magnetic energy through said coil.

2. The combination as in claim 1, wherein said inductor is embedded in said card.

3. The combination of claim 1 wherein said card has an interactive face, the axis of said coil lies perpendicular to said interactive face, said coil has a first side adjacent said interactive face and a second side and said core piece lies adjacent said second coil side and extends substantially beyond said coil in a direction parallel to said interactive face.

4. The combination, as in claim 1, wherein said core piece comprises a sheet of amorphous magnetic metallic alloy.

5. The combination as in claim 3, wherein said core piece comprises a sheet of amorphous magnetic metallic alloy.

6. The combination of claim 4 wherein said card has an interactive face, the axis of said coil lies perpendicular to said interactive face, said coil has a first side adjacent said interactive face and a second side and said core piece has a first section adjacent said coil second side and a second section adjacent said interactive card face.

7. A portable data card comprising memory means for storing data, processor means for processing data, input/output means for communicating with at least one fixed reader station and energy conversion means for converting magnetic energy transmitted from said reader station into electric energy for energizing said memory means and said processor means, said power conversion means comprising a flat multiturn coil of electrically conductive material, rectifier means connected to said coil, said memory means and said processor means, and a flexible magnetic and nonmagnetostrictive core piece positioned to direct said transmitted magnetic energy through said coil.

8. A portable data card, as in claim 7, comprising, in addition, timing means connected to said energy conversion means for deriving timing pulses related to the frequency of said transmitted magnetic energy for timing data transfer between said memory means and said processor means.

9. A portable data card as in claim 7, having no external electrical contact and wherein said card has an interactive face, the axis of said coil lies perpendicular to said interactive face, said coil has a first side adjacent said interactive face and a second side and said core piece lies adjacent said second coil side and extends substantially beyond said coil in a direction parallel to said interactive face.

10. A portable data card as in claim 7 wherein said core piece comprises amorphous, magnetic metallic alloy.

11. A portable data card as in claim 10 having no external electrical contact and wherein said card has an interactive face, the axis of said coil lies perpendicular to said interactive face, said coil has a first side adjacent said interactive face and a second side and said core piece has a first section adjacent said coil second side and a second section adjacent said interactive card face.

* * * * *